United States Patent [19]
Asberry

[11] 3,961,319
[45] June 1, 1976

[54] GROUND CIRCUIT MONITOR
[75] Inventor: James Robert Asberry, Mount Carmel, Ill.
[73] Assignee: AMF Incorporated, White Plains, N.Y.
[22] Filed: May 21, 1975
[21] Appl. No.: 579,385

[52] U.S. Cl. ............................. 340/255; 317/18 A; 5/68
[51] Int. Cl.² ........................................ G08B 21/00
[58] Field of Search .................... 340/253, 255, 256; 317/18 A, 18 B, 18 C, 18 D; 5/63, 66, 68

[56] References Cited
UNITED STATES PATENTS

| | | | |
|---|---|---|---|
| 2,207,202 | 7/1940 | La Deau | 340/255 X |
| 2,806,993 | 9/1957 | Matousek | 317/18 A X |
| 3,072,827 | 1/1963 | Benish | 340/255 |
| 3,289,194 | 11/1966 | King | 340/256 X |
| 3,320,480 | 5/1967 | Failor | 317/18 D |
| 3,407,336 | 10/1968 | Embree | 340/255 X |
| 3,426,342 | 2/1969 | De Langis | 340/255 |
| 3,728,581 | 4/1973 | Adamo | 340/255 X |
| 3,766,434 | 10/1973 | Sherman | 317/18 A |
| 3,766,435 | 10/1973 | Childers | 317/18 A |

*Primary Examiner*—John W. Caldwell
*Assistant Examiner*—Daniel Myer
*Attorney, Agent, or Firm*—George W. Price; John H. Gallagher

[57] ABSTRACT

A monitoring circuit to detect an open circuit in the ground conductor of an electrical system. The circuit also senses a high inpedance and leakage current in the ground conductor. Additionally, the circuit protects against reversal of the high and neutral input supply conductors. The circuit includes a delayed latching circuit which prevents reconnection of a device to be protected.

18 Claims, 4 Drawing Figures

GROUND CIRCUIT MONITOR

BACKGROUND OF THE INVENTION

In many diverse situations involving the use of electrical equipment it is desired to know that the a.c. lines from the source are properly connected and that the ground line is free of faults. This is particularly true where humans will be in contact with the frames and housings of apparatus containing electrical equipment. At the present time it is very desirable, and in some instances mandatory, that ground monitoring devices be used on mining apparatus, and on electrical or electronic medical apparatus, for example. One example of the latter is an articulated hospital bed whose various portions are raised and lowered by respective electrical motors. In this case, in order to protect a patient against electrical shock, the metal bed frame is grounded. In other situations a patient connected to an electrical diagnostic instrument potentially would be subject to electrical shock if the ground conductor were open circuited. It therefore is desirable to have means to monitor the ground conductor to determine if there is good continuity to earth ground.

A ground monitor circuit intended for use in the medical environment must be extremely sensitive without itself injecting into the ground conduction a magnitude of current which could be considered to be a potential hazard. The ground monitor of this invention possesses uncommonly high sensitivity and injects into the ground conductor a current no greater than approximately ten microamperes, a magnitude well below any hazard level.

DESCRIPTION OF PREFERRED EMBODIMENT

Figure 1:
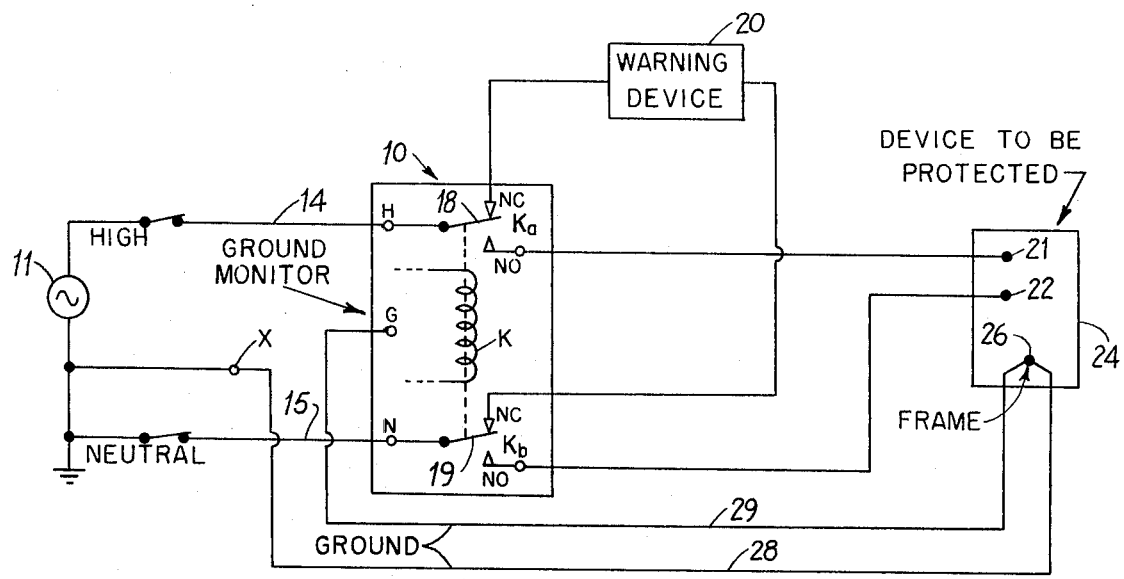
FIG. 1 is a simplified illustration of the use of the ground monitor of this invention and showing the ground monitor connected into the electrical supply system of electrical apparatus which is to be protected against a faulty ground connection.

In FIG. 1, the ground line monitor 10 of this invention is connected at its input terminals H and N to the high and neutral conductors 14 and 15. A 60 cycle, 120 volt supply source 11 is connected to conductors 14 and 15. Neutral conductor 15 is connected to earth ground at source 11. As will be described in detail below, ground monitor 10 includes relay coil K and two sets of relay contacts Ka and Kb. In the unenergized state of relay coil K, movable arms 18 and 19 of the relay are in contact with respective normally closed contacts (NC) of contact sets Ka and Kb. A warning device 20 is connected to the normally closed contacts. The frame or housing of the device 24 to be protected is provided with at least one ground wire terminal 26. Ground conductors 28 and 29 respectively connect ground terminal 26 to earth ground at the source and to ground terminal G of ground monitor 10.

In the absence of an open condition in the ground conductor to earth ground, relay coil is energized and movable arms 18 and 19 are in contact with their respective normally open (NO) contacts to connect the high and neutral conductors 14 and 15 to input terminals 21 and 22 of electrical equipment such as a motor that is in or on the device 24. Upon the detection of an open condition in ground conductors 28 or 29 by ground monitor 10, relay coil K will be deenergized and movable arms 18 and 19 will return to their respective normally closed (NC) contacts. Warning device 20 then is connected to high and neutral supply conductors 14 and 15 and a visible and/or audible alarm will be sounded. Warning device 20 may be located adjacent device 24 to be protected, or it may be located at a remote monitoring location, or both.

Figure 2:
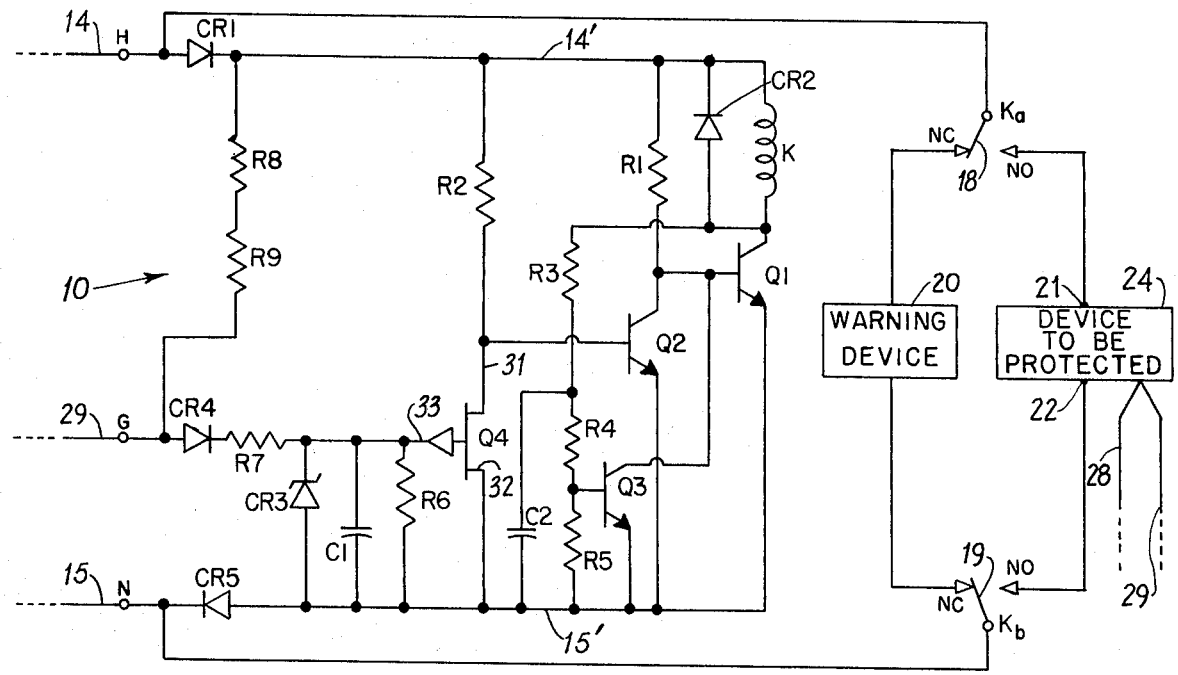
FIG. 2 is a schematic diagram of the ground monitor of the present invention.

Referring now in detail to the schematic diagram of the ground monitor circuit, FIG. 2, input terminals H, G, and N are respectively connected to high conductor 14, ground conductor 29 and neutral conductor 15. Relay coil K is connected between high terminal H and neutral terminal N through a circuit that includes diode $CR_1$, conductor 14', the collector-emitter path of transistor $Q_1$, conductor 15', and diode $CR_5$. Diode $CR_2$ is connected in reverse polarity across coil K to limit back emf voltages across the coil and to maintain energization of the coil during the negative half cycles of the a.c. supply voltage.

The base electrode of transistor $Q_1$ is connected through resistor $R_1$ to high conductor 14'. The collector of transistor $Q_2$ is connected to resistor $R_1$ and to the base of transistor $Q_1$. The emitter of transistor $Q_2$ is connected to neutral conductor 15'.

The collector of transistor $Q_3$ is connected to the base of transistor $Q_1$ and to the junction between resistor $R_1$ and the collector of transistor $Q_2$. The emitter of transistor $Q_3$ is connected to neutral conductor 15'. The base of transistor $Q_3$ is connected through resistors $R_4$ and $R_3$ to the junction between relay coil K and the collector of transistor $Q_1$. Capacitor $C_2$ is connected between neutral conductor 15' and the junction between resistors $R_3$ and $R_4$. As will be explained in more detail below, capacitor $C_2$ and resistors $R_3$ and $R_4$ comprise a delay means for delaying the application of a signal to the base of transistor $Q_3$.

The base of transistor $Q_2$ is connected to a junction between resistor $R_2$ and p channel JFET transistor $Q_4$. Transistor $Q_4$ is a bilateral conducting device that is in its conducting stage between its drain and source electrodes 31 and 32 when a negative or ground potential is applied to its gate electrode 33, and is turned off when a positive signal of given magnitude is applied to its gate electrode.

Resistor $R_6$, capacitor $C_1$, and Zener diode $CR_3$ are connected between gate electrode 33 of JFET transistor $Q_4$ and neutral conductor 15'. Diode $CR_4$ and resistor $R_7$ are connected between input ground terminal G and gate electrode 33 of transistor $Q_4$. Resistors $R_8$ and $R_9$ are connected in series between the cathode of diode $CR_1$ and input ground terminal G.

Movable contact arms 18 and 19 of relay contact sets Ka and Kb are respectively connected to high and neutral input terminals H and N. When relay coil K is unenergized, movable arms 18 and 19 contact the respective normally closed (NC) contacts of contact sets Ka and Kb to connect warning device 20 to the high and neutral conductors 14 and 15, thereby to energize that device. When relay coil K is energized, movable arms 18 and 19 are in contact with the normally open (NO) contacts of contact sets Ka and Kb to connect the device to be protected 24, or electrical equipment associated therewith, to high and neutral conductors 14 and 15. Ground conductors 28 and 29 are connected to the frame or housing of the device 24. As is evident from FIG. 1, the other end of ground conductor 29 is the input to ground terminal G of the ground monitor of FIG. 2.

In the schematic illustration of FIG. 2, transistors $Q_1$, $Q_2$ and $Q_3$ are shown as npn transistors and transistor $Q_4$ is shown as a P channel JFET device. Also, the diodes are poled for conduction on the positive half cycles of the supply voltage. It is obvious that the circuit would be equivalent if pnp transistors were used, transistor $Q_4$ were an N channel JFET device, and the polarities of the diodes were reversed. Of course, any suitable types of controlled conduction devices may be employed so long as they function in accordance with the teachings of this invention. In the discussion which follows, the conduction or nonconduction of transistors will be with reference to the positive half cycles of the a.c. supply voltages inasmuch as diodes $CR_1$ and $CR_5$ are poled for positive half cycle conduction.

In the operation of the ground monitor of FIG. 2 under normal conditions in which high and neutral conductors 14 and 15 are connected to the a.c. source and ground conductors 28 and 29 are properly connected and providing good ground connection, input ground terminal G and input neutral terminal N will be at substantially the same potential because they both are connected to earth ground at source 11, as illustrated in FIG. 1. Consequently, substantially no signal will be present at gate electrode 33 of JFET transistor $Q_4$ and that transistor will be in its conducting state. With transistor $Q_4$ conducting, transistor $Q_2$ is turned off and base drive current is supplied to the base electrode of transistor $Q_1$ through resistor $R_1$. Transistor $Q_1$ therefore is conducting to energize relay coil K. Movable arms 18 and 19 of the relay are transferred by energized coil K to normally open contacts (NO) of contact sets Ka and Kb to connect input terminals 21 and 22 of device 24 to high and neutral conductors 14 and 15.

Transistor $Q_3$ does not conduct on initial application of source voltage to the circuit because capacitor $C_2$ and resistors $R_3$ and $R_4$ produce a delay in the application of a signal to the base of transistor $Q_3$. When transistor $Q_1$ conducts before transistor $Q_3$, insufficient base drive current then will be available at the base of transistor $Q_3$ to turn it on. Transistor $Q_3$ therefore remains nonconducting. Device 24 which is to be protected against an open ground line will continue to be connected to a.c. source 11 so long as normal operating conditions exist.

In the operating condition just described a small current of the order of 10 microamperes will flow from input terminal H, through diode $CR_1$, resistors $R_8$ and $R_9$, to input terminal G and onto ground conductor 29. Because ground conductor 29 and neutral conductor 15 are at substantially the same potential, being connected to earth ground at source 11, there will be substantially no current flow from input ground terminal G through diode $CR_4$, resistors $R_7$ and $R_6$, and diode $CR_5$ to neutral conductor N. As mentioned above, this condition causes JFET transistor $Q_4$ to be in its conducting state.

In the event that ground conductor 28 should have an open circuit therein, as at point X in FIG. 1, for example, the electrical system is a potential hazard to persons who may come into contact with the frame or housing of device 24. With ground conductor 28 open at point X, input terminals G and N no longer are at the same potential and a current path exists between high conductor 14 and neutral conductor 15 by way of diode $CR_1$, resistors $R_8$ and $R_9$, diode $CR_4$, and resistors $R_7$ and $R_6$. The circuit parameters are so proportioned that the voltage developed across resistor $R_6$ will be sufficient to turn off JFET transistor $Q_4$. Base drive current now is available through resistor $R_2$ to the base of transistor $Q_2$ and it will turn on. With transistor $Q_2$ conducting, base drive current is shunted from the base of transistor $Q_1$ and $Q_1$ turns off. Relay coil K now will be deenergized.

The turn off of transistor $Q_1$ makes base drive current available through coil K and resistors $R_3$ and $R_4$ to the base electrode of transistor $Q_3$. This base drive current is insufficient to energize relay coil K. After a short delay period of the order of 30 milliseconds, for example, which is provided by capacitor $C_2$ and resistors $R_3$ and $R_4$, transistor $Q_3$ conducts. Because the collector of transistor $Q_3$ is connected to the base of transistor $Q_1$, the conduction of transistor $Q_3$ assures that the switching transistor $Q_1$ will be held in its nonconducting state, thus maintaining the relay coil K in its deenergized state.

Relay coil K cannot be reenergized even if the open circuit condition at point X in ground conductor 28 is corrected to reestablish ground continuity. This latch-out feature prevents the possibility that a path to ground might be established through a human body, for example, and thus allow power to be reapplied to the device 24 to be protected. This latch-out feature is provided by transistor $Q_3$ and operates as follows. Suppose that while switching transistor $Q_1$ is held in its nonconducting state by the conduction of latching transistor $Q_3$, the open circuit condition at point X in ground conductor 29 is corrected. Input terminals G and N again are at substantially the same potential and JFET transistor $Q_4$ will turn on. Transistor $Q_2$ no longer will have base drive current and it will turn off. However, transistor $Q_3$ is conducting and will continue to conduct through resistor $R_1$ because it is deriving base drive current through relay coil K. So long as transistor $Q_3$ is conducting it shunts base drive current from the base of transistor $Q_1$ and $Q_1$ cannot conduct. Relay coil K therefore is effectively latched out and cannot be reenergized. Transistor $Q_3$ will remain conducting as long as a sufficient charge is maintained on capacitor $C_2$. Capacitor $C_2$ may be discharged only by removing the connection between high and neutral conductors 14, 15 and the a.c. source 11. If the a.c. supply conductors and ground conductors 28 and 29 are properly connected and have continuity, reapplication of a.c. power will cause transistor $Q_4$ and switching transistor $Q_1$ to conduct and energize relay coil K, as described above.

Figure 3:
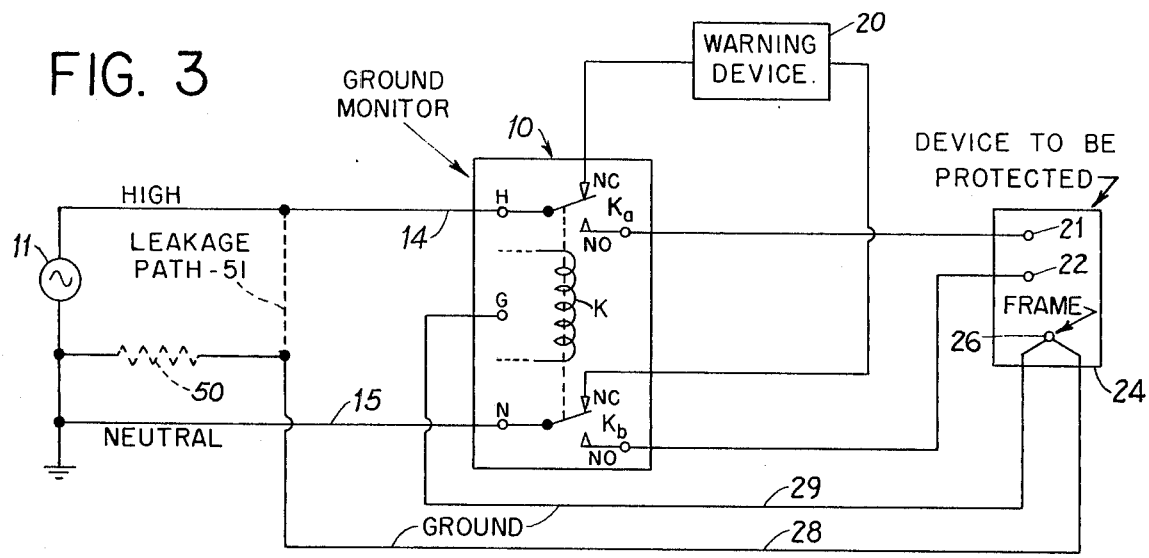
FIG. 3 is a simplified illustration similar to FIG. 1 but showing one type of fault condition on the ground conductor of the system.

The ground monitor circuit of this invention also will operate to protect against a condition of high resistance in the ground conductor, accompanied by a leakage current from high conductor 14. This condition is illustrated in the simplified sketch of FIG. 3. The excessive ground conductor resistance is illustrated in broken lines by resistor 50 and the leakage current path is illustrated by the broken line 51 extending between high conductor 14 and ground conductor 28. This condition is a potential hazard because a human body may provide a lower resistance path to earth ground for the leakage current than does the high resistance ground conductor 28.

Referring again to FIG. 2, leakage current flowing through the high resistance 51 in ground conductor 28 will cause a voltage potential to appear between the ground and neutral input terminals G and N of the ground monitor. As long as this potential is low, the condition is not particularly hazardous. If the potential becomes as high as 20 to 30 volts, however, this is considered hazardous and the ground monitor then will respond to deenergize relay coil K in the following manner.

The circuit parameters at the input to the gate electrode of JFET transistor $Q_4$ are so proportioned that when the potential difference between input terminals G and N exceeds a predetermined magnitude, the current through diode $CR_4$ and resistors $R_7$ and $R_6$, as filtered by capacitor $C_1$, will cause JFET transistor $Q_4$ to turn off. Then in the same manner as described above switching transistor $Q_1$ will turn off, relay coil K will be deenergized and will be latched in its deenergized state by the conduction of transistor $Q_3$. Device 24 will be disconnected from a.c. source 11 and warning device 20 will be actuated. As a practical matter, the circuit parameters are chosen so that JFET transistor $Q_4$ will turn off and relay coil K will be deenergized when the voltage on the gate electrode of $Q_4$ is in the range of 8 volts r.m.s.

A still further feature of the ground monitor circuit of this invention is that relay coil K, and thus device 24, cannot be energized if high and neutral conductors 14 and 15 are reversed in their connection to the input terminals H and N of ground monitor 10. If this improper connection were made, a voltage potential would exist between the ground and neutral input terminals G and N and JFET transistor $Q_4$ would not conduct. The circuit proceeds to operate as described above to deenergize relay coil K, disconnect device 24 from the a.c. supply and actuate warning device 20.

Representative parameter values and type designations for circuit components illustrated in FIG. 2 are as follows:

Resistors:
$R_1$ 82 k ohms
$R_2$ 91 k ohms
$R_3$ 120 k ohms
$R_4$ 120 k ohms
$R_5$ 9,000 k ohms
$R_6$ 3,000–9,000 k ohms
$R_7$ 150 k ohms
$R_8$ 4,700 k ohms
$R_9$ 4,700 k ohms
Capacitors:
$C_1$ 3,300 p farads
$C_2$ 100,000 p farads
Transistors:
$Q_1$ MPS-A42 Motorola
$Q_2$ MPS-A05 Motorola
$Q_3$ MPS-A05 Motorola
$Q_4$ P 1087E Intersil
Diodes:
$CR_1$–$CR_4$ 1N4007
Relay
K KU1608 Potter and Brumfield One of the salient features of the ground monitor of this invention is its very high sensitivity while at the same time injecting only a very small magnitude of current into the ground conductor. In normal operation, the current flowing from input terminal H through resistors $R_8$ and $R_9$ to ground terminal G is of the order of approximately 10 microamperes. The input impedance of JFET transistor $Q_4$ should be large compared to the resistance of resistor $R_6$, and in practice was of the order of 50 megaohms. The high input impedance of transistor $Q_4$ permits it to switch conducting states with a very small input current which may be of the order of 7 or 8 microamperes, for example. If desired, a high input impedance MOS-FET semiconductor device may be used in place of the JFET device of transistor $Q_4$.

Another important feature of the ground monitor circuit of this invention is the latching feature provided by the operation of transistor $Q_3$. This feature prevents relay coil K from being reenergized by the reestablishment of ground continuity through the ground conductor. As previously explained, the a.c. input must be disconnected and capacitor $C_2$ permitted to discharge before relay coil K again can be energized. This feature prohibits a patient or other person from inadvertently activating the relay once it has become deenergized.

Further important features of the present invention are that in addition to sensing an open ground conductor it detects a high impedance and leakage current in the ground conductor and also detects a reversal of the high and neutral input supply conductors.

Figure 4:
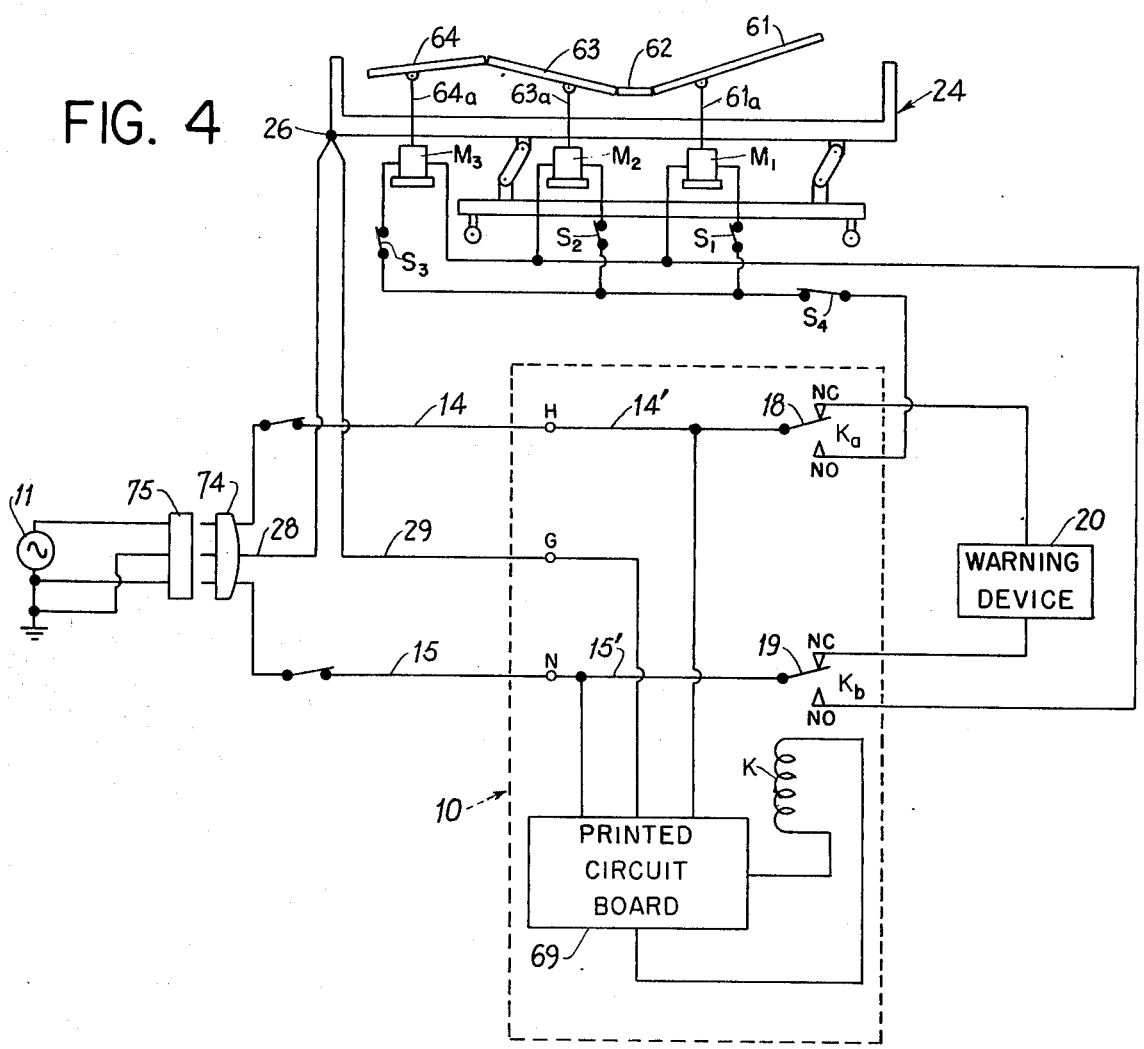
FIG. 4 is a simplified wiring diagram illustrating the monitoring device of this invention connected into a system for monitoring the ground connection to a metal bed frame of a type used in hospitals.

FIG. 4 is a simplified illustration of how the ground monitor circuit of this invention may be used to provide protection for a patient in a hospital bed. The bed 24 has a metal conducting frame and is comprised of a plurality of articulated sections 61, 62, 63, 64. Sections 61, 63 and 64 are independently movable by means of respective lifting mechanisms 61a, 63a and 64a. Electrical motors $M_1$, $M_2$ and $M_3$, respectively, are operatively connected to lifting mechanisms 61a, 63a and 64a. The motors are connected in parallel to the normally open contacts (NO) of contact sets Ka and Kb and are independently energizable by means of respective single pole single throw switches $S_1$, $S_2$ and $S_3$. A switch $S_4$ is provided in the energization circuit to all motors.

The ground monitor 10 is shown in simplified form in a broken-line rectangle in FIG. 4. Most of the circuitry illustrated in FIG. 2 is included on a printed circuit board 69. The input terminals H, G and N, relay coil K, contact sets Ka and Kb, movable arms 18 and 19, and warning device 20, are the same as illustrated in FIGS. 1 and 2. Warning device 20 may be a neon light, and/or a device which produces an audible signal, and may be mounted on the conducting frame 24 or at a remote monitoring central station, or both.

High, neutral and ground conductors 14, 15 and 28 are connectable to a.c. source 11 through connectors 74 and 75.

The ground monitor 10 will operate as previously described to disconnect a.c. power from motors $M_1$, $M_2$, $M_3$ on bed 24 and to produce an alarm by way of warning device 20 upon occurrence of any of the faults discussed above. Ground conductors 28 and 29 are connected to ground terminal 26 on the metal bed frame of bed 24.

While a preferred embodiment of the invention has been illustrated and described, it is to be understood that alterations and modifications may be made to the described embodiment without departing from the scope of the present invention.

What is claimed is:

1. In a ground monitor device the combination comprising
   first, second and third input terminals for coupling thereto, respectively, the high, ground and neutral conductors of an electrical supply source, said ground and neutral conductors normally being coupled to earth ground at least at said source,
   a relay winding connected between said high and neutral conductors,
   switching means having first and second switching conditions connected between said high and neutral conductors,
   said switching means operating to energize said relay winding when in its first switching condition and operating to deenergize the relay winding when in its second switching condition,
   means responsive to the voltage between said second and third input terminals for producing a first signal when said voltage differs by a predetermined magnitude from a given voltage,
   means coupling said switching means to the means responsive to the voltage between the second and third input terminals for operating the switching means to its second switching condition upon occurrence of said first signal,
   delayed operating latch means operatively coupled to said switching means for latching said switching means in its second switching condition at a fixed time delay after occurrence of said first signal, and
   relay switch means operable in response to energization of said relay winding.

2. The combination claimed in claim 1 and further including a high impedance conduction path coupled between said first and second terminals for limiting current flow therebetween to a value below that considered to be hazardous to a human that may come into conductive contact therewith.

3. The combination claimed in claim 2 wherein said means responsive to the voltage between said second and third input terminals has an input coupled to said second input terminal and wherein said combination further includes a second high impedance conduction path coupled between said second and third input terminals.

4. The combination claimed in claim 3 wherein said means responsive to the voltage between the second and third input terminals has an input impedance which is larger than the impedance of said high impedance conduction path between the second and third input terminals.

5. The combination claimed in claim 4 wherein said switching means is serially connected with said relay winding between said first and third input terminals, and further including
   means for providing only unidirectional current flow through said relay winding and switching means and through said two high impedance conduction paths.

6. The combination claimed in claim 5 wherein said switching means comprises
   a three electrode controlled conduction device having a control electrode and second and third electrodes, said second and third electrodes being connected for a serial conduction path with said relay winding.

7. The combination claimed in claim 6 wherein said delayed operating latch means comprises
   a second three electrode controlled conduction device having a control electrode and second and third electrodes,
   one of said second and third electrodes of the second controlled conduction device being coupled to the control electrode of the first controlled conduction device and the other one of the second and third electrode of the second controlled conduction device being coupled to the like terminal of the first controlled conduction device, and
   signal delay means for coupling the control electrode of the second controlled conduction device to a junction between the relay winding and said first controlled conduction device.

8. Electrical monitoring means for disconnecting an electrical utilization apparatus from electrical supply conductors upon occurrence of an undesired electrical condition comprising,
   first, second and third input terminals for coupling thereto, respectively, high, ground and neutral conductors of an electrical supply source, said ground and neutral conductors normally being coupled to earth ground at least at said source,
   switch means for selectively connecting at least said high conductor to an electrical utilization apparatus,
   means including high impedance means for establishing a high impedance unidirectional current path between said first and second input terminals,
   said high impedance means being proportioned to limit current flow through said path to a magnitude less than that considered to be potentially hazardous to a human,
   monitoring means for monitoring the voltage between said second and third input terminals and for producing a first signal when said voltage exceeds a predetermined magnitude,
   means coupled to the monitoring means for operating said switch means to connect said high conductor to said utilization apparatus in the absence of said first signal and substantially immediately responsive to said first signal to operate said switch means to disconnect said high conductor from the utilization apparatus, and
   delayed operating means operatively coupled to said last named means and operable only after a given time delay following said first signal for disabling said last named means from further operating said switching means.

9. The combination claimed in claim 8 wherein said delayed operating means is so constructed and so operatively connected to said means coupled to the monitoring means to be rendered inoperable and incapable of disabling said means coupled to the monitoring means in the event said means coupled to the monitoring means first is operated to connect the high conductor to the utilization apparatus.

10. The combination claimed in claim 8 wherein said means coupled to the monitoring means for operating said switch means comprises:
    a relay coil and a semiconductor switching device series connected between said first and third input terminals,
    said semiconductor device having a control electrode coupled to receive said first signal and also coupled through impedance means to said first terminal and being rendered nonconductive upon occurrence of said first signal, said switch means being operable in response to energization and deenergization of said coil.

11. The combination claimed in claim 10 wherein said delayed operating means comprises:

a second semiconductor device having a control electrode coupled to a junction between said relay coil and said semiconductor switching device, and signal delay means for coupling the control electrode of the second semiconductor device to said junction, said second semiconductor device being constructed and connected to provide a conduction path from the control electrode of the semiconductor switching device to the third input terminal only at a given time after the first occurrence of said first signal, thereby to hold said semiconductor switching device in a nonconducting state.

12. In a ground monitor device the combination comprising:

first, second and third input terminals for respectively coupling thereto high, ground and neutral conductors of an electrical supply source, said ground and neutral conductors normally being connected to earth ground at least at said source, means for providing a first unidirectional current path between said first and third input terminals, a relay winding connected in said first unidirectional current path between said first and third input terminals.

a first controllable conduction device having a control electrode and second and third electrodes connected for serial current conduction through said winding and said controllable conduction device, means including first high impedance means for providing a first high impedance unidirectional current conduction path between said first and second input terminals, means including second high impedance means for providing a second high impedance unidirectional current conduction path between said second and third input terminals, said two impedance means being proportioned to limit current in the respective high impedance conduction paths to values less than that considered potentially hazardous to a human who may come into conductive contact therewith, means coupled to said second high impedance conduction path for monitoring a voltage difference between said second and third input terminals and for producing a first signal when said voltage difference reaches a predetermined magnitude, means for coupling said first signal to the control electrode of the first controllable conduction device to cause conduction to substantially cease therethrough, thereby to deenergize the relay coil, relay switch means for providing switching operations in response to energization and deenergization of said relay winding, a second controllable conduction device having a control electrode and second and third electrodes, signal delay means for coupling the control electrode of the second controllable conduction device to a junction between said winding and said first controllable conduction device, means for coupling the second and third electrodes of the second controllable conduction device between the control electrode of the first controllable conduction device and the third input terminal, means for coupling the control electrode of said first controllable conduction device to said first input terminal by way of said first unidirectional current path, whereby a conduction path from the control electrode of the first controllable conduction device through the second controllable conduction device is provided at a predetermined time after occurrence of said first signal, thereby to latch said first controllable conduction device in its nonconducting condition even though said first signal should terminate.

13. The combination claimed in claim 12 wherein said signal delay means comprises a resistance-capacitance time delay circuit for preventing the second controllable conduction device from initially conducting prior to initial conduction of the first controllable conduction device in the absence of said first signal.

14. The combination claimed in claim 12 wherein said means for monitoring the voltage difference between said second and third input terminals is a semiconductor FET device having an input impedance higher than the respective high impedance unidirectional current conduction paths between the first and second and between the second and third input terminals.

15. The combination claimed in claim 14 wherein said relay switch means include at least one pair of contacts and a movable arm movable between said contacts in response to energization and deenergization of said relay winding, and further including:

means for coupling said high conductor to said movable arm, a warning device coupled to one of said contacts of the relay switch means, and an electrical utilization apparatus coupled to the other contact of the relay switch means.

16. The combination claimed in claim 15 and including:

a ground conductor connecting said second input terminal to a ground terminal on said utilization apparatus, said ground terminal being connected to the ground conductor of said electrical supply system.

17. An electrical system monitoring device comprising:

first, second and third input terminals for coupling thereto, respectively, high, ground and neutral conductors of an electrical system, said ground and neutral conductors normally being coupled to earth ground at least at the source of said system, a relay coil coupled between said first and third input terminals, a first three electrode transistor having its collector-emitter conduction path series connected between said coil and third input terminal, rectifier means coupled between said first terminal and said coil for providing a unidirectional current path therethrough, resistance means coupled between said rectifier means and second input terminal for providing a first high impedance unidirectional current conduction path therebetween, second rectifier means and resistor means coupled between said second and third input terminals for providing a second high impedance unidirectional conduction path therebetween, said first and second high impedance paths each limiting current therethrough to respective values less than that considered potentially hazardous to a human, and FET semiconductor device having one of its drain or source electrodes connected through resistor means to a junction between said rectifier means and coil and the other one of its drain or source electrodes coupled to said third terminal, said FET device having its gate electrode coupled to said second high impedance unidirectional conduction path for monitoring the voltage difference between said second and third input terminals, said FET device having an input impedance greater than that of the second high impedance path, and producing an output signal when the voltage difference between said second and third terminals exceeds a given magnitude, means for coupling an output signal from said FET device to the base electrode of said first transistor to turn it off upon occurrence of said output signal, thereby to deenergize said coil, a second three terminal transistor having its collector-emitter conduction path coupled between the base of said first transistor and said third input terminal and having its base electrode coupled to a junction between said coil and first transistor, signal delay means for coupling the base of said second transistor to the junction between the coil and first transistor, a resistor coupled between the base of said first transistor and a junction between said first rectifier means and coil, a diode connected in reverse polarity across said coil, relay switch means operable in response to the energization and deenergization of said coil, and means for coupling at least said high conductor to said relay switch means.

18. The combination claimed in claim 17 and further including:

an additional rectifier coupled to said third terminal for conducting current flowing through said coil and first transistor.

* * * * *